3,020,847
VARIABLE DISPLACEMENT PUMP
Paul W. Rohrberg, Watertown, N.Y., assignor to The New York Air Brake Company, a corporation of New Jersey
Filed June 15, 1959, Ser. No. 820,187
4 Claims. (Cl. 103—37)

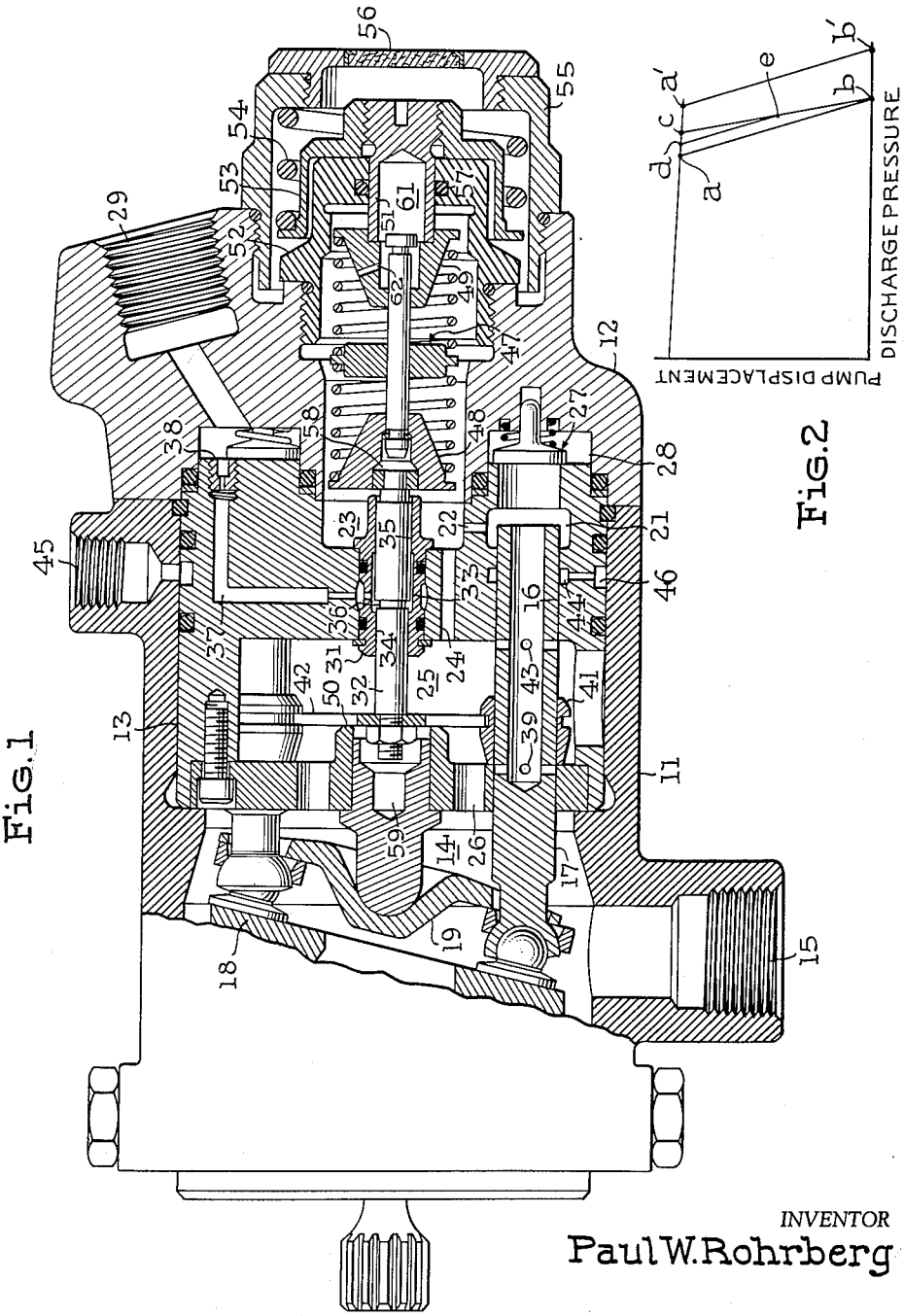

This invention relates to variable displacement pumps and more particularly to an improvement in the displacement-varying mechanism for such pumps which renders the operation of that mechanism independent of variations in inlet pressure.

In prior pumps, for example those disclosed in Huber Patents 2,433,222 and 2,664,048, granted December 23, 1947 and December 29, 1953, respectively, and Siver Patent 2,778,314, granted January 22, 1957, the displacement-varying mechanism includes a control element shiftable between minimum and maximum displacement-establishing positions, a spring for biasing that element toward its maximum displacement-establishing position, and a control motor having a working chamber subject to discharge pressure and a movable member connected with the control element and carrying a reaction surface which is subject to the pressure in the working chamber for developing a force that shifts the control element toward its minimum displacement-establishing position against the bias of the spring. The reaction surface is defined by a shoulder formed on the movable member intermediate its ends and which divides this member into two portions, namely a small diameter portion and a large diameter portion. The ends of these portions extend into spaces within the pump housing which are in communication with the inlet port and therefore they are subjected to inlet pressure. Because of this, a net pressure force is developed which opposes movement of the control element under the action of the force developed at the reaction surface.

When these prior devices are operating within their control range, that is, when discharge pressure is equal to or greater than that pressure required to develop a force at the reaction surface sufficient to overcome the preload in the bias spring, a change in inlet pressure, and consequently a change in the opposing force acting on the movable member, has the effect of producing an equal change in discharge pressure. In the past, this effect was insignificant because low inlet pressures were employed. However, today, it is of great importance, especially in the field of aircraft hydraulic systems, because much higher inlet pressures are being used. For example, it is not uncommon to encounter inlet pressures which vary between 10 and 500 p.s.i. It will be apparent that the resulting change in discharge pressure which the prior devices would produce, when operating in an environment such as this, is intolerable.

The object of this invention is to provide an improved variable displacement pump including means for counteracting the above-mentioned effect of inlet pressure. According to the invention, the biasing spring which acts on the control element is supported by a seat which is shiftable in spring-expanding and spring-compressing directions, and this seat is positioned by a device which responds to inlet pressure. The parts are so arranged that when inlet pressure rises, the seat is moved into the spring-expanding direction, and when inlet pressure decreases, the seat is moved in the opposite direction. As a result of this arrangement, the biasing force exerted by the spring is varied in inverse relation to the opposing force developed by inlet pressure and therefore the distance the control element is shifted by the control motor is rendered substantially independent of inlet pressure.

The preferred embodiment of the invention will now be described in detail with reference to the accompanying drawing, in which:

FIG. 1 is a partial axial sectional view of a swash plate pump incorporating the invention.

FIG. 2 is a graph showing characteristic displacement versus discharge pressure curves for a pump embodying the invention.

As shown in FIG. 1, the pump comprises a housing having two sections 11 and 12 which are joined by bolts (not shown) and which are formed with mating shoulders for securely clamping and holding a cylinder block 13. Section 11 is cored, as shown, to provide an inlet chamber 14 which is connected with the inlet port 15. The cylinder block 13 contains a circular series of longitudinal cylinder bores 16 which receive the pistons 17. These pistons are reciprocated in a known manner by the swash plate 18 and nutating plate 19. Each of the cylinder bores 16 communicates with inlet chamber 14 via chamber 21, passage 22, chamber 23, passage 24, chamber 25 and passages 26. Fluid discharged under pressure from cylinder bores 16 flows through spring-biased check valves 27 and annular discharge manifold 28 to the discharge port 29.

A hollow bushing 31 is mounted in an axial bore formed in cylinder block 13 and receives the slidable rod 32. This bushing contains a central chamber 33 which connects two coaxial bores 34 and 35 of different diameters. The rod 32 is formed with two portions, one fitting the bore 34 and the other fitting the bore 35, and these portions are separated by an annular groove 36. Central chamber 33 communicates with the annular discharge manifold 28 via passage 37 and choke 38.

Each of the pistons 17 contains a plurality of radial bleed passages 39 which cooperate with a spill-back valve 41 slidable on and encircling the piston for controlling the effective stroke of that piston. The spill-back valves 41 are connected with the rod 32 by a spider 42 which engages annular grooves formed in the surfaces of the valves. Each piston also contains a second set of radial passages 43 which are positioned such that they register with the annular by-pass groove 44 near the end of the discharge stroke. The by-pass grooves 44 are connected with the by-pass port 45 by manifold groove 46.

The spill-back valves 41 are normally held in the position shown in the drawing by a low rate spring assembly 47 which reacts between a seat 48 carried on the right end of rod 32 and a seat 49 carried by a reciprocable piston 51, and biases the spider 42 into contact with stop 50. The piston 51 reciprocates in a bore formed in cap 52 and carries, at its right end, a seat 53 for a high rate spring 54. Spring assembly 47 is installed with a preload so that spider 42 will remain in contact with stop 50 until discharge pressure is just slightly below the desired maximum. Spring 54 is also installed with a preload; this load being equal to the maximum compressive load in spring assembly 47. The space, within the end closure 55 that encloses spring 54 and seat 53, communicates with atmosphere through a breather plug 56. Leakage into this space along the outer periphery of piston 51 is prevented by a resilient O-ring seal 57.

During operation, chambers 14, 23 and 25 are subjected to inlet pressure. Since chamber 23 is in communication with the space 58 through the radial clearance between the right end of rod 32 and the seat 48, and since space 59 is in communication with chamber 25 across stop 50, inlet pressure acts on both ends of rod 32. The net force developed on these ends acts to the left and opposes movement of rod 32 under the action of the force developed on the radial faces of groove 36 by the discharge pressure in chamber 33. Space 61, within piston 51, is also in communication with chamber 23, and so the entire cross-sectional area of this piston is subjected to inlet pressure.

At zero inlet pressure, spring 54 holds seat 53 in abutment with cap 52 and the spring seat 49 remains stationary throughout the entire control range of the displacement-varying mechanism. When discharge pressure is below the point $a$ in FIG. 2, the force developed at groove 36 is insufficient to overcome the preload in spring assembly 47 so the rod 32 and spill-back valves 41 remain in the maximum displacement-establishing position shown in FIG. 1. As discharge pressure rises above point $a$, the discharge pressure force at groove 36 compresses spring assembly 47 and moves rod 32 and spill-back valves 41 to the right, thereby uncovering the bleed passages 39 for a progressively longer portion of each discharge stroke. This causes a progressive reduction in the effective displacement of the pump. When discharge pressure reaches point $b$ in FIG. 2, the effective displacement will be zero. When the discharge pressure decreases (due to an increase in the demand for hydraulic fluid), the effective displacement of the pump increases progressively according to the curve $ab$ of FIG. 2.

If the inlet pressure at port 15 is now increased, a net pressure force is developed at the ends of rod 32 which opposes the discharge pressure force acting at groove 36. In the absence of the present invention, this inlet pressure force has the effect of shifting the curve $ab$ of FIG. 2 to the right as illustrated by the curve $a'b'$; the pressure differential $(b'-b)$ being equal to and varying with the inlet pressure. However, with the present invention, the inlet pressure also acts on piston 51 and develops a force which tends to shift that piston and seat 49 to the right against the bias of spring 54. The rates of spring 54 and spring assembly 47 are so correlated with the area of piston 51 and the differential area of groove 36 that once the preload in spring 54 is exceeded, movement of seat 49 in the spring-expanding direction resulting from the inlet pressure force acting on piston 51 reduces the load in spring assembly 47 an amount equal to the net inlet pressure force acting on rod 32.

Since the preload in spring 54 equals the maximum compressive load which will be exerted by spring assembly 47, i.e., the force which this assembly exerts when the rod 32 and spill-back valves 41 are in the zero displacement-establishing position, piston 51 will begin to move at different inlet pressures depending upon the existing discharge pressure. Thus, if the discharge pressure corresponds to the point $b$ in FIG. 2 (and consequently the load in spring assembly 47 equals the preload in spring 54), any increase in inlet pressure above zero will cause movement of piston 51. As a result, the maximum discharge pressure of the pump will correspond to point $b$ regardless of inlet pressure. If, on the other hand, the discharge pressure corresponds to point $a$ at the time the inlet pressure is increased, piston 51 will not begin to move to the right until the inlet pressure has reached a value sufficient to produce a force on piston 51 which is slightly greater than the difference between the maximum load and the preload in spring assembly 47. In a typical case this pressure is 100 p.s.i. Because of this, a decrease in the demand for hydraulic fluid does not result in a decrease in pump displacement until discharge pressure reaches the point $c$ which represents a pressure that is 100 p.s.i. greater than the pressure represented by point $a$. As the discharge pressure increases beyond this point, pump displacement is reduced in accordance with curve $cb$. At inlet pressures below 100 p.s.i., the displacement versus discharge pressure curve takes the form of curve $deb$; the curve portion $de$ being parallel with curve $ab$ and the curve portion $eb$ being coincident with the curve $cb$. It will be apparent that the point $e$ on this curve represents that combination of discharge pressure and inlet pressure which initiates movement of piston 51.

It will be observed that the slope of curves $cb$ and $eb$ is greater than the slope of curve $ab$. This is attributable to the fact that when piston 51 moves to the right and separates seat 53 and cap 52, spring 54 is placed in series with the spring assembly 47. Since the effective rate of a pluraliy of springs connected in series is less than the rate of any one of the springs acting alone, the change in discharge pressure required to shift rod 32 a specified distance after seat 53 and cap 52 separate necessarily will be smaller than the change required to produce the same shift before the separation occurs.

It will also be observed that the pressure differential $(c-a)$ is a function of the preload in spring 54, and that as this preload approaches the preload in spring assembly 47, the curve $cb$ approaches coincidence with the curve $ab$. If the two preloads were equal then spring assembly 47 and spring 54 would be connected in series at all times and the effect of inlet pressure on rod 32 could be counterbalanced at all discharge pressures. Although this may be a desirable feature in some installations, it is believed that the embodiment wherein the seat 53 and cap 52 function as a stop for spring 54, and thus permit the use of different preloads, is preferable because it minimizes the risk of dynamic instability which might result from the friction between O-ring 57 and piston 51.

As stated previously, the drawings and description relate only to the preferred embodiment of the invention. Since many changes can be made in the structure of this embodiment without departing from the inventive concept, the following claims should provide the sole measure of the scope of the invention.

What is claimed is:

1. In a pump of the type including a housing having an internal space which is connected with the inlet port and subject to inlet pressure, a displacement-controlling element mounted within the housing and shiftable between maximum and minimum displacement-establishing positions, a control motor comprising a working chamber and a movable member connected with the displacement-controlling element, the member having a first reaction surface subject to the pressure in the working chamber for developing a force which urges the displacement-controlling element toward one of said displacement-establishing positions and a second reaction surface which is subject to the pressure in said internal space and develops a force which urges the displacement-controlling element toward the other of said displacement-establishing positions, and a spring-biasing the displacement-controlling element toward the other of said displacement-establishing positions, the improvement which comprises a spring seat for the biasing spring that is shiftable in spring-expanding and spring-compressing directions, the seat being impositively connected with the displacement-controlling element through the spring so that the seat, throughout its range of motion, is movable relatively to the displacement-controlling element; and means connected with the seat and responsive to the pressure in said internal space for moving the seat in the spring-expanding direction as the pressure in said internal space rises and for moving the seat in the spring-compressing direction as the pressure in said internal space decreases.

2. The improvement defined in claim 1 in which the means for shifting the spring seat comprises a second spring reacting between the housing and the seat and urging the seat in the said spring-compressing direction; and a third reaction surface carried by the seat and subject to the pressure in said internal space, the surface developing a pressure force which urges the seat in the spring-expanding direction against the bias of the second spring.

3. The improvement defined in claim 2 including a stop for limiting movement of the seat in the spring-compressing direction; and in which the two springs are preloaded, the second spring being subject to a higher preload than the first spring.

4. The improvement defined in claim 3 in which the preload in the second spring equals the load in the first spring when the displacement-controlling element is in said one displacement-establishing position.

References Cited in the file of this patent

UNITED STATES PATENTS

| | | |
|---|---|---|
| 1,935,544 | De Lancey | Nov. 14, 1933 |
| 2,512,799 | Huber | June 27, 1950 |
| 2,562,615 | Huber | July 31, 1951 |